US011308631B2

(12) United States Patent
Shishido

(10) Patent No.: US 11,308,631 B2
(45) Date of Patent: Apr. 19, 2022

(54) MOTION VECTOR DETECTION DEVICE

(71) Applicant: JVCKENWOOD Corporation, Yokohama (JP)

(72) Inventor: Tomoyuki Shishido, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 242 days.

(21) Appl. No.: 16/811,141

(22) Filed: Mar. 6, 2020

(65) Prior Publication Data
US 2020/0211204 A1 Jul. 2, 2020

Related U.S. Application Data

(63) Continuation of application No. PCT/JP2018/010683, filed on Mar. 19, 2018.

(30) Foreign Application Priority Data

Sep. 27, 2017 (JP) .............................. JP2017-185638

(51) Int. Cl.
G06T 7/246 (2017.01)
G06T 7/254 (2017.01)
G06F 17/16 (2006.01)
H04N 19/577 (2014.01)
H04N 19/51 (2014.01)

(52) U.S. Cl.
CPC .............. G06T 7/248 (2017.01); G06F 17/16 (2013.01); G06T 7/254 (2017.01); H04N 19/577 (2014.11); G06T 2207/20224 (2013.01); H04N 19/51 (2014.11)

(58) Field of Classification Search
CPC .......... G06T 2207/20021; G06T 7/254; G06T 7/223; G06T 7/238; H04N 19/577; H04N 19/52; H04N 19/105; H04N 19/51
See application file for complete search history.

(56) References Cited

U.S. PATENT DOCUMENTS

| | | | | |
|---|---|---|---|---|
| 2003/0215014 A1* | 11/2003 | Koto | ..................... | H04N 19/132 375/240.16 |
| 2008/0212886 A1* | 9/2008 | Ishii | ....................... | H04N 19/17 382/239 |
| 2010/0284464 A1* | 11/2010 | Nagori | ................. | H04N 19/105 375/240.15 |
| 2011/0293195 A1* | 12/2011 | Nakagami | ............ | H04N 19/117 382/233 |
| 2019/0297339 A1* | 9/2019 | Hannuksela | ........... | H04N 19/59 |

FOREIGN PATENT DOCUMENTS

JP 2008-245135 A 10/2008

* cited by examiner

Primary Examiner — Margaret G Mastrodonato
(74) Attorney, Agent, or Firm — Nath, Goldberg & Meyer; Jerald L. Meyer

(57) ABSTRACT

When determining that a pixel of a future frame, which is included in a search range, includes a pixel on an outside of an effective image area, and determining that pixels inside an effective image area of a past frame are present at positions point-symmetric to pixels inside the search range and on an outside of the effective image area about a pixel of interest, a pixel selector selects pixels in an effective image area of a past frame, the pixels being located at the point-symmetric positions. The pixel selector calculates difference values between the pixel of interest and the selected pixels inside the effective image area of the past frame.

3 Claims, 10 Drawing Sheets

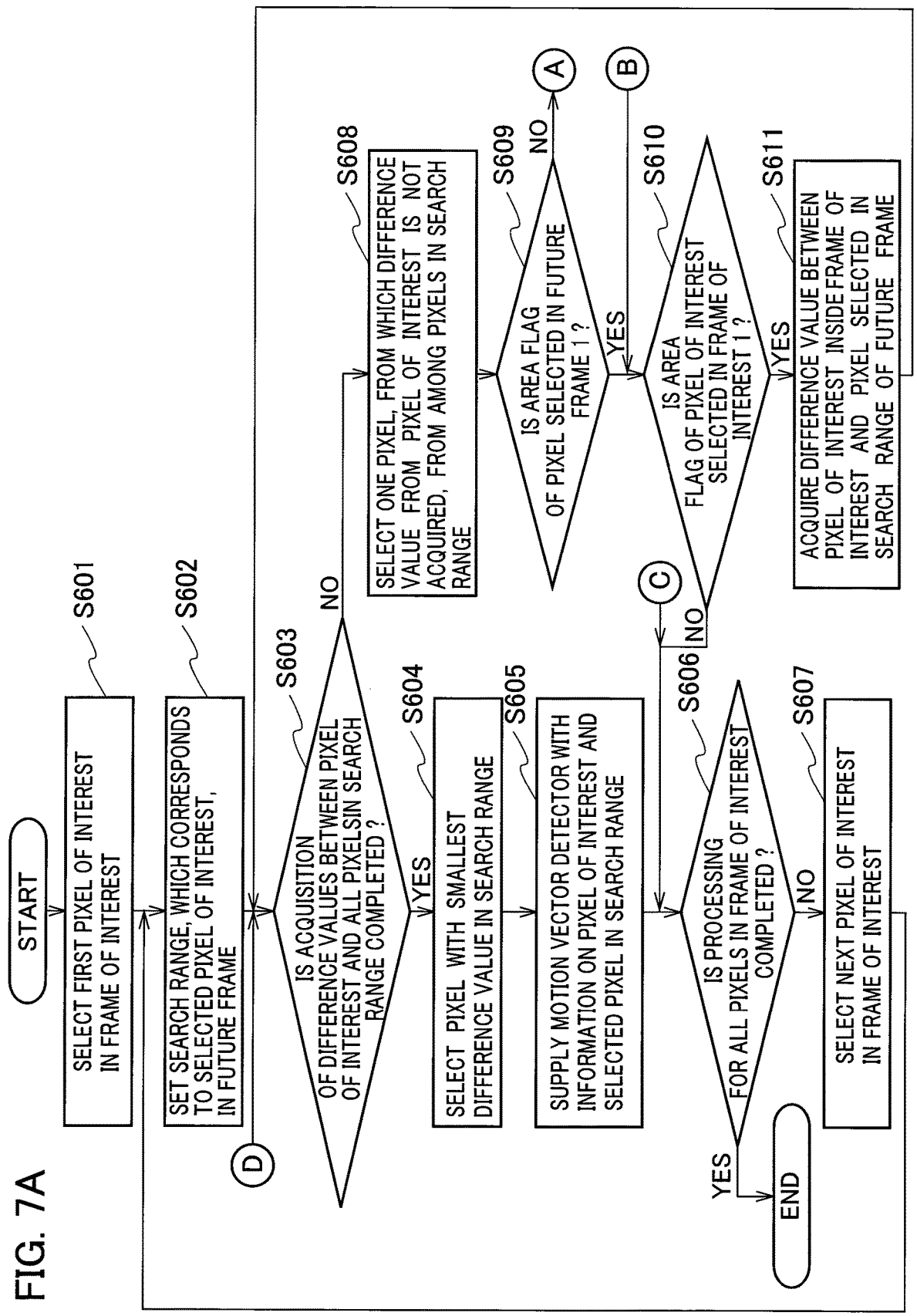

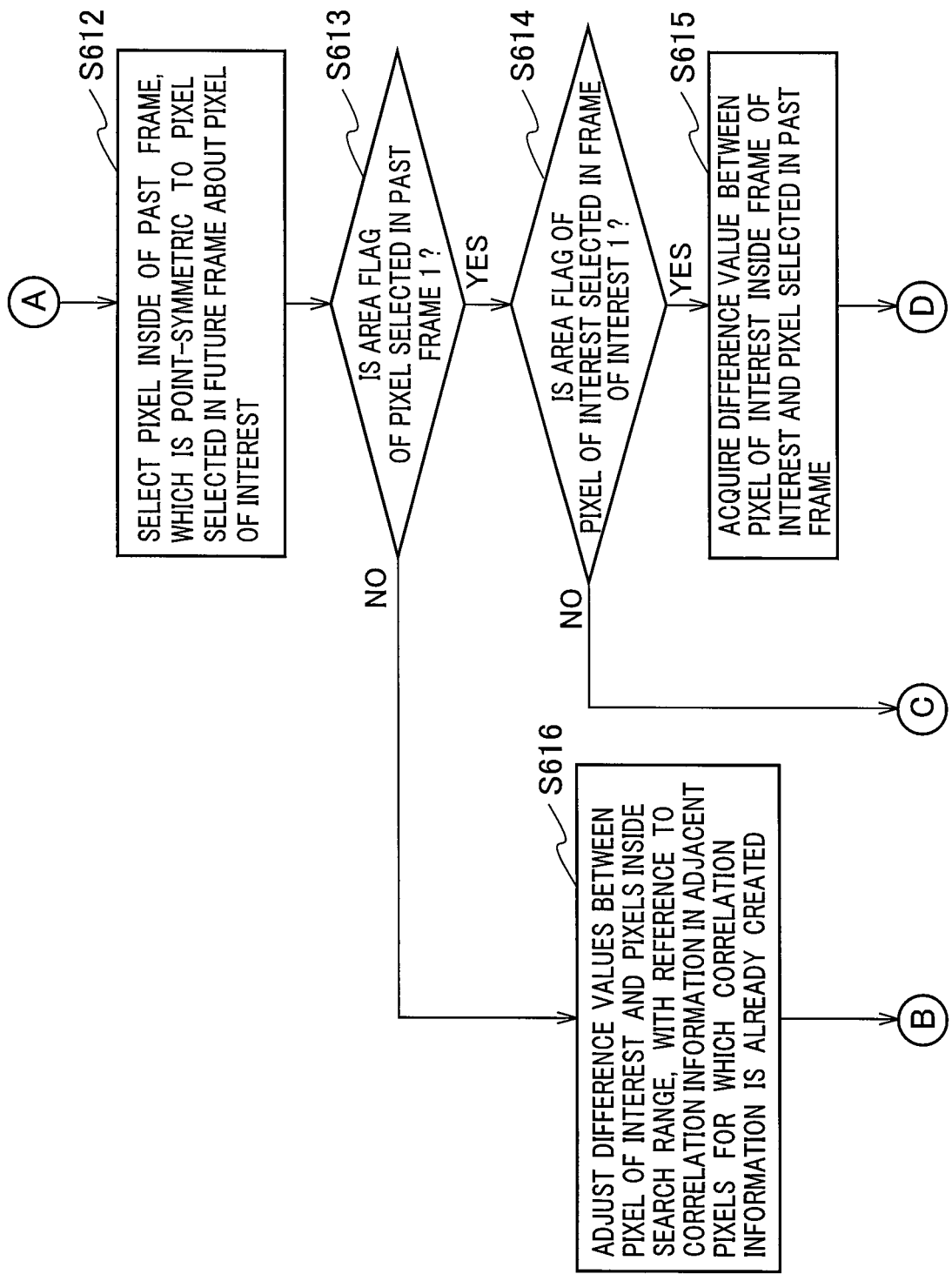

MOTION VECTOR DETECTION DEVICE

CROSS REFERENCE TO RELATED APPLICATION

This application is a Continuation of PCT Application No. PCT/JP2018/010683, filed on Mar. 19, 2018, and claims the priority of Japanese Patent Application No. 2017-185638, filed on Sep. 27, 2017, the entire contents of both of which are incorporated herein by reference.

BACKGROUND

The present disclosure relates to a motion vector detection device that detects a motion vector of an image.

A frame frequency conversion apparatus that interpolates an interpolation frame between two frames adjacent to each other to convert a frame frequency includes a motion vector detection device that detects a motion vector of an image (refer to Japanese Unexamined Patent Application Publication No. 2008-245135). The motion vector detection device estimates a motion of an image by comparing pixels between two adjacent frames with each other, for example.

SUMMARY

When there occurs a frame in which an object moves from an outside of a frame into an inside thereof or frame out in which the object moves from the inside the frame to the outside thereof, the motion vector detection device sometimes cannot detect a correct motion vector. When the correct motion vector is not detected, the frame frequency conversion apparatus cannot generate correct interpolation pixels, and accordingly, an interpolation frame with a feeling of discomfort is generated.

An aspect of one or more embodiments provides a motion vector detection device which, among three frames arrayed in a time direction in a video signal, defines a frame located at a center as a frame of interest, defines a frame located in a future from the frame of interest as a future frame, and defines a frame located in a past from the frame of interest as a past frame, and includes: an area flag giving unit; a pixel selector; and a motion vector detector.

The area flag giving unit gives a first value as an area flag to respective pixels inside of each of effective image areas of the frame of interest, the future frame, and the past frame, and to give a second value as the area flag to respective pixels on an outside of the effective image area.

The pixel selector selects, as a pixel of interest, a pixel inside an effective image area of the frame of interest based on the area flag given to the frame of interest, sets a search range, which corresponds to the pixel of interest, inside the future frame, and when determining that all pixels of the future frame, which are included in the search range, are pixels in the effective image area based on the area flag given to the future frame, calculates difference values between the pixel of interest and all the pixels inside the search range, selects a pixel with a smallest difference value and extracts the pixel as a selected pixel, and generates correlation information including information indicating a pixel position of the pixel of interest and information indicating a pixel of the selected pixel.

The motion vector detector detects a motion vector in the pixel of interest based on the correlation information.

when determining that the pixel of the future frame, the pixel being included in the search range, includes a pixel on an outside of the effective image area based on the area flag given to the future frame, and determining that a pixel inside the effective image area of the past frame is present at a position point-symmetric to a pixel inside the search range and on the outside of the effective image area about the pixel of interest based on the area flag given to the past frame, the pixel selector selects a pixel inside the effective image area of the past frame, the pixel being located at the point-symmetric position, in place of the pixel inside the search range and on the outside of the effective image area, and calculates a difference value between the pixel of interest and the selected pixel inside the effective image area of the past frame.

BRIEF DESCRIPTION OF THE DRAWINGS

FIG. 7A is a flowchart illustrating operations of the pixel selector.

FIG. 7B is a flowchart illustrating operations of the pixel selector, which are subsequent to FIG. 7A.

DETAILED DESCRIPTION

Hereinafter, a description will be given of motion vector detection devices according to respective embodiments with reference to the accompanying drawings. Configurations in which frame frequency conversion apparatuses include the motion vector detection devices according to the respective embodiments will be described as examples. The motion vector detection devices may be provided in apparatuses other than the frame frequency conversion apparatuses.

First Embodiment

Figure 1:
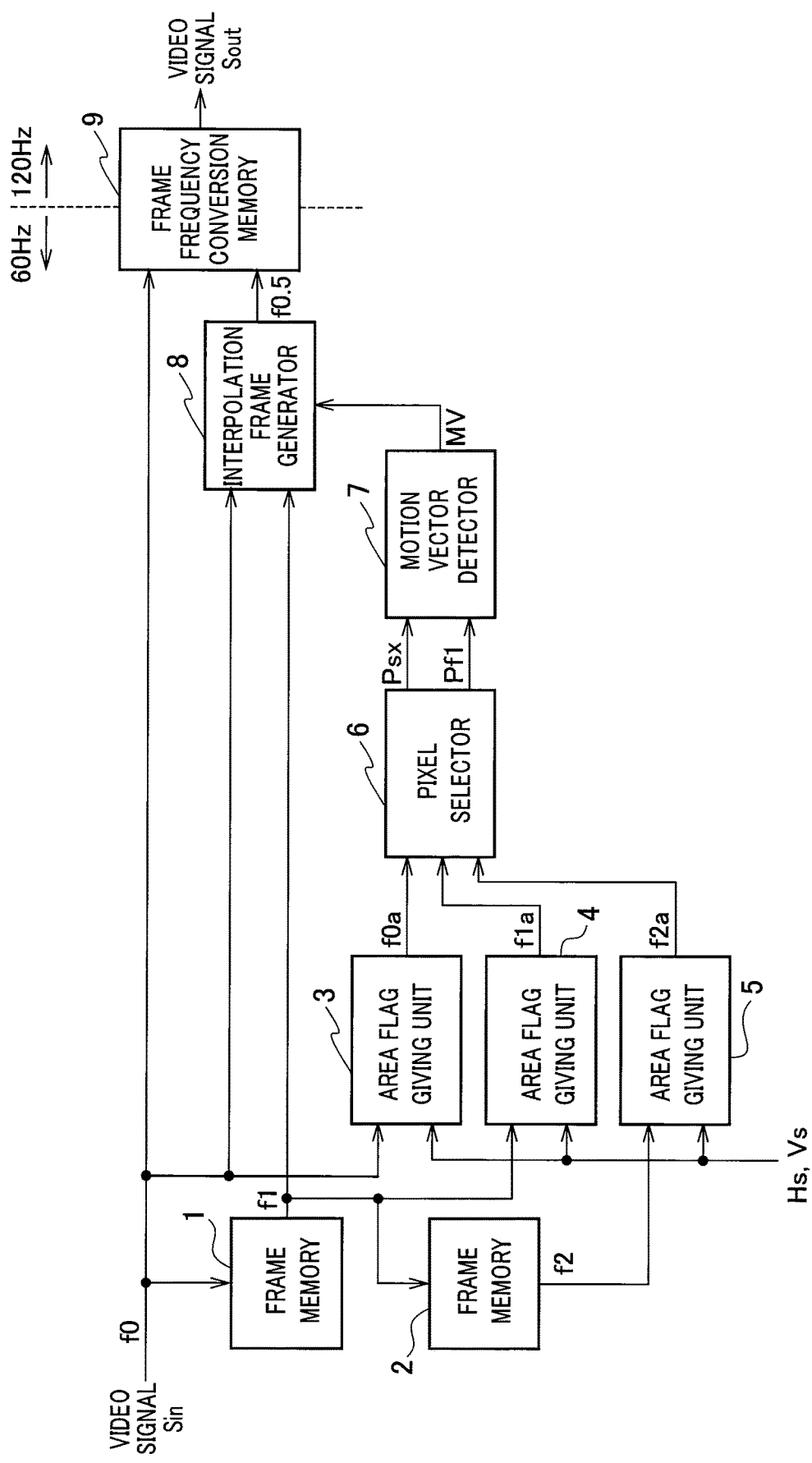
FIG. 1 is a block diagram illustrating a frame frequency conversion apparatus including a motion vector detection device according to a first embodiment.

In FIG. 1, a video signal Sin input to a frame frequency conversion apparatus is supplied to a frame memory 1, an area flag giving unit 3, an interpolation frame generator 8, and a frame frequency conversion memory 9. A frame of the video signal Sin is defined as a frame f0. A frame frequency of the video signal Sin is 60 Hz as an example.

The frame memory 1 delays the video signal Sin by one frame period, and generates a past frame f1 one frame before the frame f0. The frame f1 is supplied to a frame memory 2, an area flag giving unit 4, and the interpolation frame generator 8. The frame memory 2 delays the frame f1 by one frame period, and generates a past frame f2 one frame before the frame f1. The frame f2 is supplied to an area flag giving unit 5.

Among the three frames f0, f1, and f2 arrayed in a time direction in the video signal Sin, the frame f1 located at the center is defined as a frame of interest, the frame f0 located in a future from the frame of interest f1 is defined as a future frame, and the frame f2 located in a past from the frame of interest f1 is defined as a past frame.

To the area flag giving units 3 to 5, there are input a horizontal synchronization signal Hs and vertical synchronization signal Vs of the video signal Sin. In place of the horizontal synchronization signal Hs and the vertical synchronization signal Vs, a horizontal synchronization pulse and a vertical synchronization pulse, which are generated based on the horizontal synchronization signal Hs and the vertical synchronization signal Vs, may be input to the area flag giving units 3 to 5.

Figure 2:
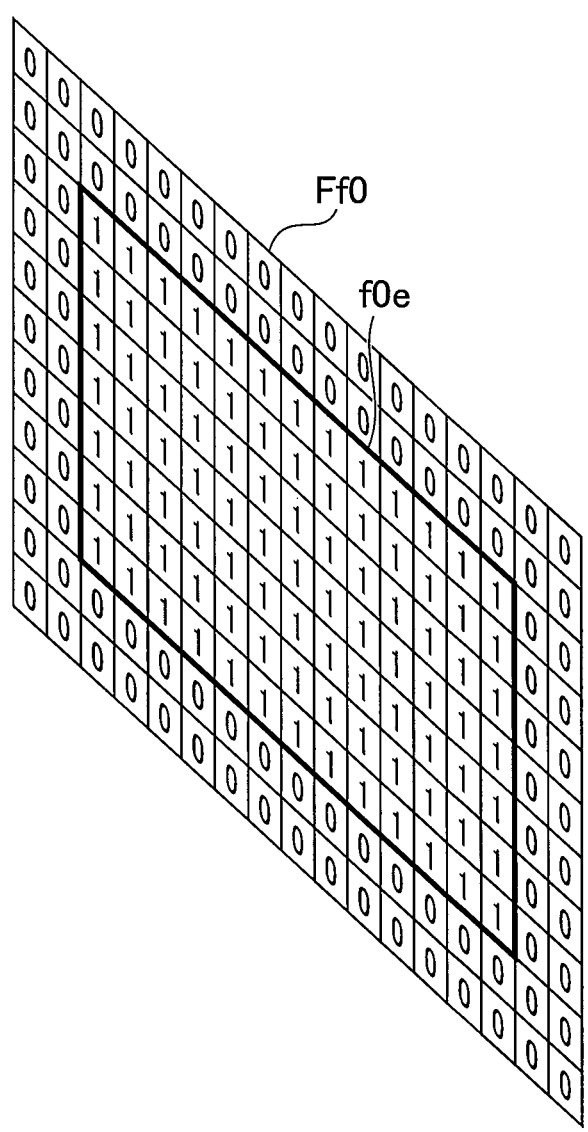
FIG. 2 is a view illustrating area flags to be given to respective pixels in a frame in the motion vector detection device according to a first embodiment.

As illustrated in FIG. 2, based on the horizontal synchronization signal Hs and the vertical synchronization signal Vs (the horizontal synchronization pulse and the vertical synchronization pulse), the area flag giving unit 3 gives, as area flags, 1 that is a first value to respective pixels inside an effective image area f0e of the frame f0, and 0 that is a second value to respective pixels on an outside of the effective image area f0e. Frames illustrated in FIG. 2 and the drawings subsequent thereto are conceptual diagrams in which the number of pixels is reduced to a large extent for simplification.

The area flag giving unit 3 supplies the pixel selector 6 with a flag-attached frame F0a including an area flag Ff0 given as illustrated in FIG. 2 and respective pixel signals of the frame f0. Pixel values of the respective pixels located outside of the effective image area f0e in the frame f0 are set to 0 for example.

Similar to the area flag giving unit 3, the area flag giving units 4 and 5 supply the pixel selector 6 with flag-attached frames f1a and f2a including area flags given to the frames f1 and f2 and respective pixel signals of the frames f1 and f2. Since the pixel values of the respective pixels located outside of the effective image area f0e in the frame f0 are 0, pixel values of respective pixels located on the outsides of the effective image areas f1e and f2e (see FIG. 3) in the frames F1 and f2 are 0.

The pixel selector 6 sequentially defines, as such pixels of interest, pixels at respective pixel positions in the effective image area f1e of the frame of interest f1, and sets, in the future frame f0, a search range corresponding to the pixels of interest. The search range is a range composed of a plurality of pixels at a time of obtaining such a pixel in the future frame f0, which has the highest correlation with the pixel of interest. Typically, the search range is a range with a predetermined shape, which has, as a center, a pixel in the future frame f0, the pixel being located at the same pixel position as that of the pixel of interest.

Figure 3:
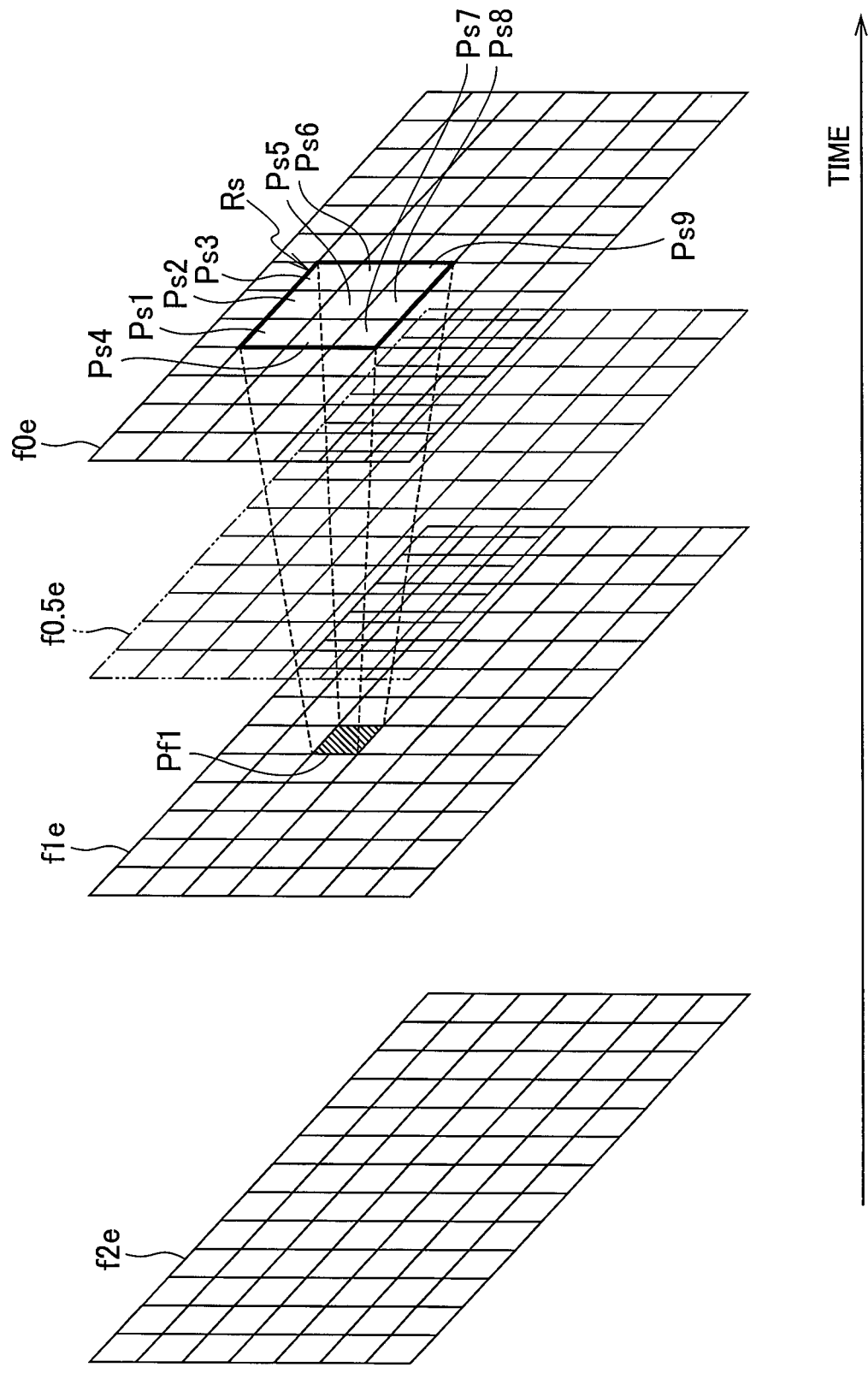
FIG. 3 is a diagram for explaining a normal operation of a pixel selector when a search range is located within an effective image area.
Figure 4:
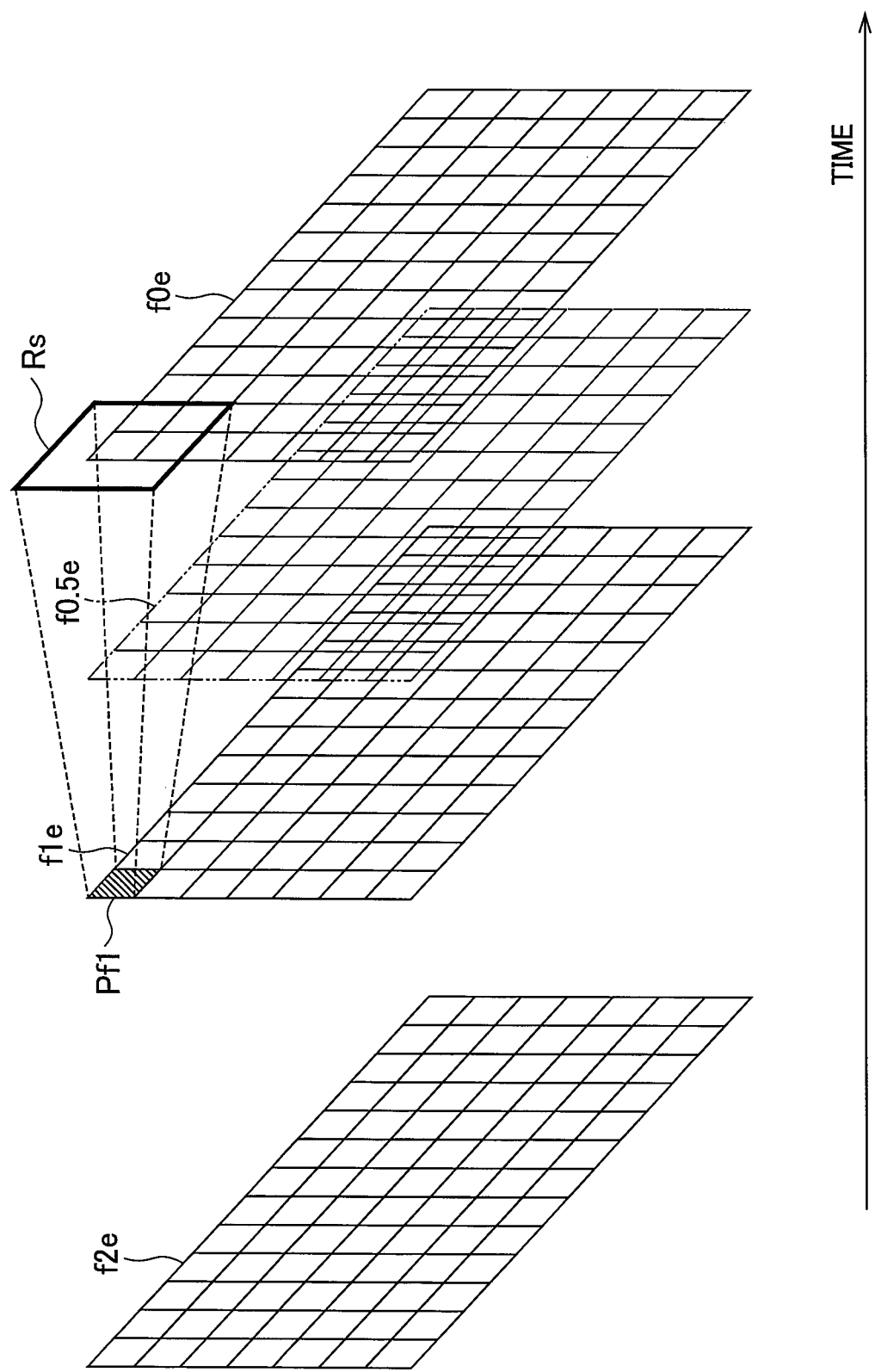
FIG. 4 is a view illustrating an example of a case in which a part of the search range is located outside of the effective image area.
Figure 5:
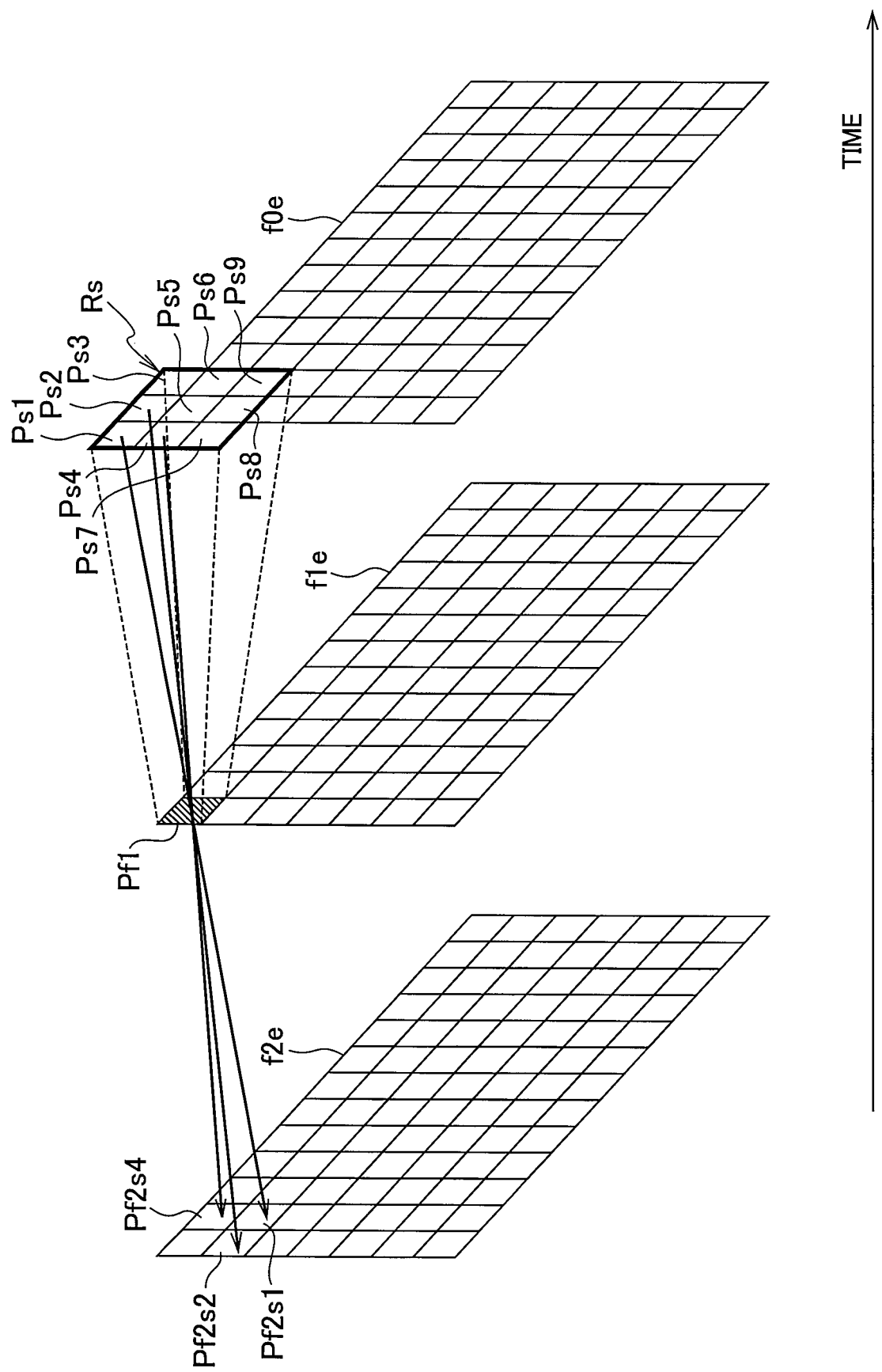
FIG. 5 is a diagram for explaining an operation of the pixel selector when a part of the search range is located outside of the effective image area.

First, referring to FIG. 3, a description will be made of a normal operation of the pixel selector 6 when the search range is located within the effective image area f0e. In FIG. 3 to FIG. 5, the effective image areas f0e, f1e, and f2e in the future frame f0, the frame of interest f1, and the past frame f2 are illustrated. It is assumed that, as illustrated in FIG. 3, the pixel selector 6 selects, as a pixel of interest Pf1, a hatched pixel in the effective image area f1e of the frame of interest f1. At this time, in the effective image area f0e of the future frame f0, the pixel selector 6 set a search range Rs having, as a center, a pixel located at the same pixel position as that of the pixel of interest Pf1.

Here, the search range Rs is defined to be square; however, it may have a rectangular shape long in the horizontal direction, and the shape of the search range Rs is not limited. Here, the search range Rs includes pixels Ps1 to Ps9.

In FIG. 1, the pixel selector 6 calculates difference values between the pixel of interest Pf1 and the individual pixels Ps1 to Ps9, and selects a pixel with a smallest difference value (that is, highest correlation). The pixel selector 6 extracts, as a selected pixel Psx, a pixel selected in the search range Rs of the future frame f0. The pixel selector 6 supplies the motion vector detector 7 with, as correlation information, information indicating a pixel position of the pixel of interest Pf1 and information indicating a pixel position of the selected pixel Psx.

The motion vector detector 7 is sequentially supplied with the correlation information obtained in each pixel of interest Pf1 of the frame of interest f1.

Next, referring to FIG. 4 and FIG. 5, a description will be made of an operation of the pixel selector 6 when a part of the search range Rs is located outside of the effective image area f0e. Taken as an example is a case in which, as illustrated in FIG. 4, the pixel selector 6 selects a hatched pixel which is located on a left end portion of an uppermost line of the effective image area f1e as the pixel of interest Pf1. At this time, the search range Rs set by the pixel selector 6 in the future frame f0 is partially located outside of the effective image area f0e.

When the pixel selector 6 selects the pixel of interest Pf1 from a plurality of lines located on the upper and lower end portions of the effective image area f1e and right and left end portions thereof, a part of the search range Rs is located outside of the effective image area f0e as in FIG. 5. In order to detect a correct motion vector when a frame in or a frame out occurs, it is necessary that the motion vector be appropriately detected even when a part of the search range Rs is located outside of the effective image area f0e.

Based on the area flag Ff0, the pixel selector 6 can recognize which pixel among the pixels Ps1 to Ps9 in the search range Rs is located outside of the effective image area f0e. Here, as illustrated in FIG. 5, the pixels Ps1 to Ps4 and Ps7 are located outside of the effective image area f0e.

At a time of attempting to calculate the difference value between the pixel of interest Pf1 and the pixel Ps1, the pixel selector 6 recognizes that the pixel Ps1 is located outside of the effective image area f0e. Accordingly, in place of the pixel Ps1, the pixel selector 6 selects a pixel Pf2s1 in the effective image area f2e of the past frame f2, which is located at a position point-symmetric to the pixel Ps1 about the pixel of interest Pf1, and calculates a difference value between the pixel of interest Pf1 and the pixel Pf2s1.

Likewise, in place of the pixels Ps2 and Ps4, the pixel selector 6 selects pixels Pf2s2 and Pf2s4 in the effective image area f2e, which are located at positions point-symmetric to the pixels Ps2 and Ps4 about the pixel of interest Pf1, respectively, and calculates difference values between the pixel of interest Pf1 and the pixels Pf2s2 and Pf2s4.

At a time of attempting to calculate the difference value between the pixel of interest Pf1 and the pixel Ps3 or Ps7, the pixel selector 6 recognizes that the pixel Ps3 or Ps7 is located outside of the effective image area f0e. However, a position point-symmetric to the pixel Ps3 or Ps7 about the pixel of interest Pf1 is not present in the effective image area f2e, and the pixels in the past frame f2 cannot be used in place of the pixels Ps3 and Ps7.

Accordingly, the pixel selector 6 calculates the difference value between the pixel of interest Pf1 and the pixel Ps3, and the difference value between the pixel of interest Pf1 and the pixel Ps7. As described above, the pixel values of the respective pixels located outside of the effective image area f0e are set to 0, and accordingly, the difference value between the pixel of interest Pf1 and the pixel Ps3, and the difference value between the pixel of interest Pf1 and the pixel Ps7 sometimes become extremely large values.

Even if a direction directed from the pixel of interest Pf1 toward the pixel Ps3 is the motion vector, there is little possibility that the pixel Ps3 will be selected as a pixel with a smallest difference value since the difference value between the pixel of interest Pf1 and the pixel Ps3 is a large value. When a possibility that the direction directed from the pixel of interest Pf1 toward the pixel Ps3 in the motion vector is high, it is necessary to increase the possibility that the pixel Ps3 will be selected as the pixel with the smallest difference value.

Accordingly, the pixel selector 6 adjusts the difference value between the pixel of interest Pf1 and the pixel Ps3, and the difference value between the pixel of interest Pf1 and the pixel Ps7 with reference to correlation information generated in an adjacent pixel to the pixel of interest Pf1 in the frame of interest f1. The adjacent pixel is a pixel located on a side adjacent to the pixel of interest Pf1, the side being any of an upper side, a lower side, a right side, and a left side.

In the example illustrated in FIG. 5, the pixel of interest Pf1 is located on the left end portion of the uppermost line of the effective image area f1e, and accordingly, there is no detection result of a selection direction before the processing for the pixel of interest Pf1 is executed. Even in such a case, correlation information obtained when a pixel located, for example, right adjacent to the pixel of interest Pf1 illustrated in FIG. 5 is defined as the pixel of interest Pf1 is fed back, whereby the difference values can be adjusted.

The pixel selector 6 may adjust the difference values with reference to correlation information generated in a pixel in the past frame f2, which is located at the same pixel position as that of the pixel of interest Pf1 in the frame of interest f1. The pixel in the past frame f2, which is located at the same pixel position, is an adjacent pixel in the time direction. The pixel selector 6 may adjust the difference values with reference to correlation information generated in not only the pixel in the past frame f2, which is located at the same pixel position as that of the pixel of interest Pf1 in the frame of interest f1, but also an adjacent pixel thereto.

The pixel selector 6 adjusts the difference value between the pixel of interest Pf1 and the pixel Ps3, and the difference value between the pixel of interest Pf1 and the pixel Ps7 to become smaller, as a similarity is higher between pieces of the correlation information generated in the adjacent pixels in the frame of interest f1 or the past frame f2.

The pixels Ps5, Ps6, Ps8, and Ps9 are present in the effective image area f0e, and accordingly, the pixel selector 6 calculates difference values between the pixel of interest Pf1 and the individual pixels Ps5, Ps6, Ps8, and Ps9.

Thus, the pixel selector 6 acquires the respective difference values between the pixel of interest Pf1 and the pixels Pf2s1, Pf2s2, and Pf2s4, the adjusted difference values in which the difference values between the pixel of interest Pf1 and the pixels Ps3 and Ps7 are adjusted, and the respective difference values between the pixel of interest Pf1 and the pixels Ps5, Ps6, Ps8 and Ps9. The pixel selector 6 selects the pixel with the smallest difference value from among these.

Figure 6A:
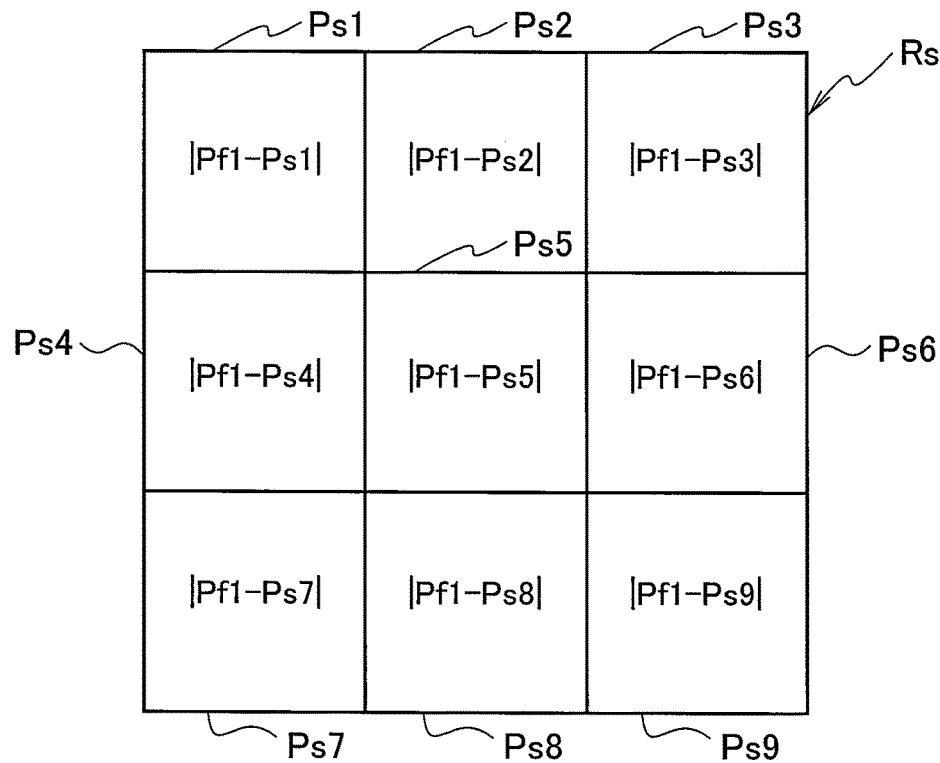
FIG. 6A is a diagram illustrating difference values calculated by the pixel selector at the time of the normal operation illustrated in FIG. 3.
Figure 6B:
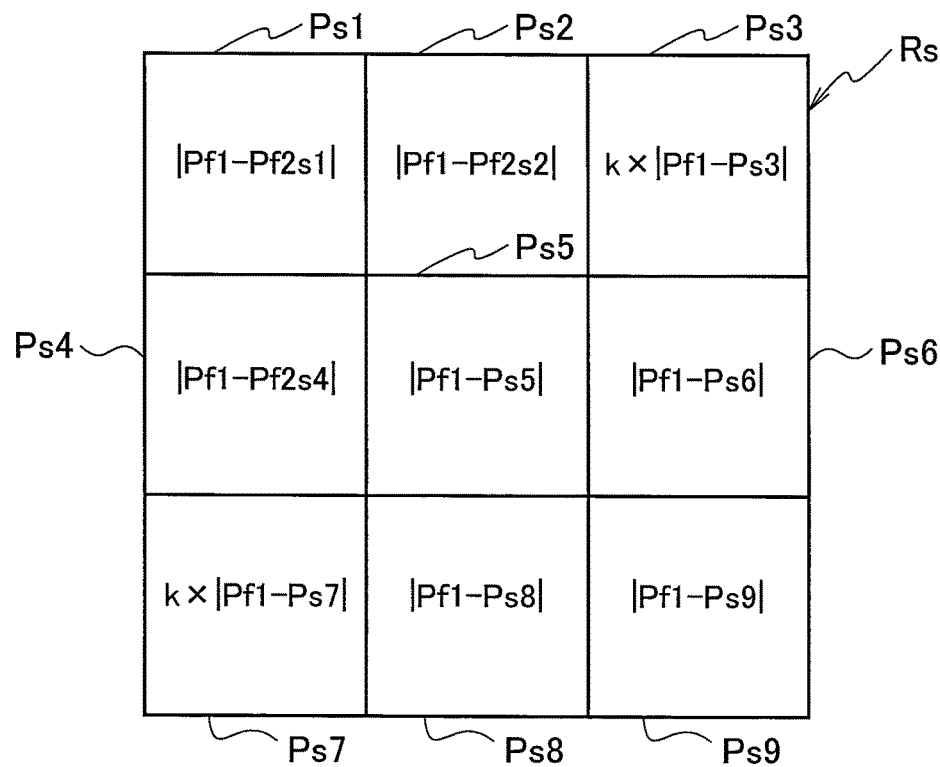
FIG. 6B is a diagram illustrating difference values calculated by the pixel selector at the time of the operation illustrated in FIG. 5.

FIG. 6A illustrates the difference values which the pixel selector 6 calculates by the operation described with reference to FIG. 3, and FIG. 6B illustrates the difference values which the pixel selector 6 calculates by the operation described with reference to FIG. 5. As illustrated in FIG. 6A, when the search range Rs is entirely located inside the effective image area f0e, the difference values between the pixel of interest Pf1 and the individual pixels Ps1 to Ps9.

As illustrated in FIG. 6B, when a part of the search range Rs is located outside of the effective image area f0e, in a case in which the pixels point-symmetric at the pixel positions located outside of the effective image area f0e are present inside the effective image area f2e of the past frame f2, the difference values between the pixel of interest Pf1 and the pixels inside the effective image area f2e are calculated. In a case in which the pixels point-symmetric at the pixel positions located outside of the effective image area f0e are not present inside the effective image area f2e, the adjusted difference values in which the difference values between the pixel of interest Pf1 and the pixels inside the search range Rs are multiplied by a predetermined coefficient k are calculated. The coefficient k is a number of 1 or less.

The pixel selector 6 sets the coefficient k to an appropriate value with reference to the correlation information generated in the adjacent pixels to the pixel of interest Pf1. The pixel selector 6 reduces the value of the coefficient k as the similarity between the pieces of correlation information is higher.

Returning to FIG. 1, based on the correlation information, the motion vector detector 7 detects, as a motion vector MV, a direction in which the respective pixels of interest Pf1 in the frame of interest f1 and the selected pixels Psx in the search range Rs, which are selected in response to the respective pixels of interest Pf1. The motion vector detector 7 supplies the interpolation frame generator 8 with the motion vector MV.

The motion vector detector 7 may supply the interpolation frame generator 8 with the motion vector MV, which is detected for each of the pixels of interest Pf1, as it is. Based on such motion vectors MV detected for each of the pixels of interest Pf1, the motion vector detector 7 may generate motion vectors MV for each of the blocks, each of which is composed of a plurality of pixels, and may supply the interpolation frame generator 8 with the generated motion vectors MV.

In the latter case, for example, even when erroneous detection of the motion vector MV occurs in a part of the pixels of interest Pf1 by averaging the motion vectors MV in the unit of pixels inside the block, a substantially correct motion vector MV can be obtained in the whole of the block.

In FIG. 1, portions from the frame memory 1 to the motion vector detector 7 configure the motion vector detection device according to a first embodiment. The frame memories 1 and 2 may be present on the outside of the frame frequency conversion apparatus. The motion vector detection device according to a first embodiment includes at least the area flag giving units 3 to 5, the pixel selector 6, and the motion vector detector 7.

Based on the motion vector MV, the interpolation frame generator 8 selects and mixes the pixels in the frame of interest f1 and the pixels in the future frame f0 with each other to generate interpolation pixels at the respective pixel positions, and generates an interpolation frame f0.5 illustrated in FIG. 3 or FIG. 4. The frame frequency conversion memory 9 is supplied with the interpolation frame f0.5.

The frame frequency conversion memory 9 writes the future frame f0 and the interpolation frame f0.5, and reads out the interpolation frame f0.5 and the future frame f0 in this order at a double frequency, thereby generating a video signal Sout having a frame frequency of 120 Hz.

Thus, the frame frequency conversion apparatus can interpolate the interpolation frame f0.5 between the frame of interest f1 and the future frame f0, which are adjacent to each other, and can output the video signal with the frame frequency of 120 Hz that is twice the frame frequency of the input video signal Sin.

Referring to a flowchart illustrated in FIG. 7A and FIG. 7B, the operations of the pixel selector 6 inside one frame will be described one more time. In FIG. 7A, in step S601, the pixel selector 6 selects the first pixel of interest Pf1 inside the frame of interest f1. In step S602, the pixel selector 6 sets the search range Rs, which corresponds to the selected pixel of interest Pf1, inside the future frame f0.

In step S603, the pixel selector 6 determines whether or not the acquisition of the difference values between the pixel of interest Pf1 and all the pixels inside the search range Rs is completed. If the acquisition of the difference values is completed (YES), then in step S604, the pixel selector 6 selects the pixel with the smallest difference value inside the search range Rs. In step S605, the pixel selector 6 supplies the motion vector detector 7 with information on the pixel of interest Pf1 and the selected pixels inside the search range Rs.

In step S606, the pixel selector 6 determines whether or not the processing for all of the pixels inside the frame of interest f1 is completed. If the processing for all of the pixels is completed (YES), the pixel selector 6 ends the processing. If the processing for all of the pixels is not completed (NO), then in step S607, the pixel selector 6 selects the next pixel of interest Pf1 inside the frame of interest f1, and repeats the processing of steps S602 to S606.

Meanwhile, if the acquisition of the difference values between the pixel of interest Pf1 and all the pixels inside the search range Rs is not completed in step S603 (NO), then in step S608, from among the pixels inside the search range Rs, the pixel selector 6 selects one pixel from which the difference value from the pixel of interest Pf1 is not acquired. In step S609, the pixel selector 6 determines whether an area flag of the pixel selected in the future frame f0 is 1.

If the area flag is 1 (YES), then in step S610, the pixel selector 6 determines whether or not the area flag of the pixel of interest Pf1 selected in the frame of interest f1 is 1. If the area flag is 1 (YES), then in step S611, the pixel selector 6 acquires the difference value between the pixel of interest Pf1 inside the frame of interest f1 and the pixel selected in the search range Rs of the future frame f0, and returns the processing to step S603.

If the area flag of the pixel of interest Pf1 selected in the frame of interest f1 is not 1 in step S610 (NO), the pixel selector 6 returns the processing to step S606.

If the area flag of the pixel selected in the future frame f0 in step S609 is not 1 (NO), then in step S612 of FIG. 7B, the pixel selector 6 selects the pixel inside the past frame f2, which is point-symmetric to the pixel selected in the future frame f0 about the pixel of interest Pf1.

In step S613, the pixel selector 6 determines whether an area flag of the pixel selected in the past frame f2 is 1. If the area flag is 1 (YES), then in step S614, the pixel selector 6 determines whether or not the area flag of the pixel of interest Pf1 selected in the frame of interest f1 is 1.

If the area flag is 1 in step S614 (YES), then in step S615, the pixel selector 6 acquires the difference value between the pixel of interest Pf1 inside the frame of interest f1 and the pixel selected in the past frame f2, and returns the processing to step S603 of FIG. 7A. If the area flag is not 1 in step S614 (NO), the pixel selector 6 returns the processing to step S606 of FIG. 7A.

If the area flag is not 1 in step S613 (NO), then in step S616, the pixel selector 6 adjusts the difference values between the pixel of interest Pf1 and the pixels inside the search range Rs with reference to the correlation information in the adjacent pixels for which the correlation information is already created, and returns the processing to step S610 of FIG. 7A.

Thus, in accordance with the motion vector detection device according to a first embodiment, the correct motion vector is detected even when a part of the search range Rs is located outside of the effective image area f0e, and the correct motion vector can be detected even when the frame in or the frame out occurs. If the motion vector detection device according to a first embodiment is used, then the interpolation frame generator 8 can generate interpolation images free from a feeling of discomfort on both a center portion and a peripheral portion in the interpolation frame f0.5.

Second Embodiment

Figure 8:
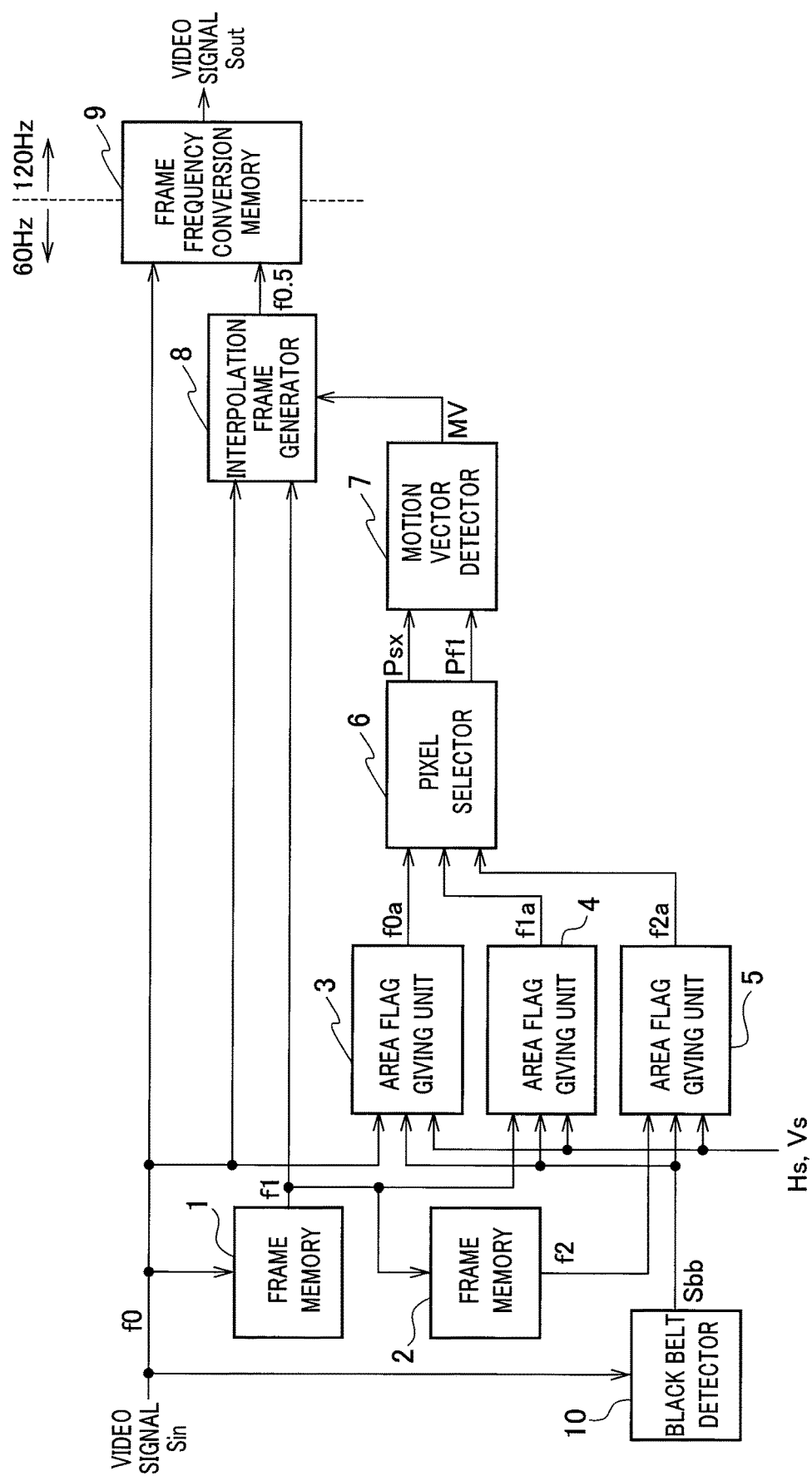
FIG. 8 is a block diagram illustrating a frame frequency conversion apparatus including a motion vector detection device according to a second embodiment.

A frame frequency conversion apparatus illustrated in FIG. 8 includes a motion vector detection device according to a second embodiment. In FIG. 8, the same reference numerals are assigned to the same portions as those in FIG. 1, and a description thereof will be omitted.

In FIG. 8, the video signal Sin is also supplied to a black belt detector 10. By a well-known method, the black belt detector 10 detects whether or not there is a black belt area and detects a range in which the black belt area is present to generate a black belt detection signal Sbb. As an example, the black belt detector 10 detects that lines, in each of which pixels having a luminance level of a predetermined threshold value or less occupy a predetermined ratio or more of all pixels in one line in the horizontal direction, are upper and lower black belt areas, and detects that lines, in each of which pixels having a luminance level of the predetermined threshold value or less occupy a predetermined ratio or more of all pixels in one line in the vertical direction, are right and left black belt areas. The black belt detection signal Sbb is supplied to the area flag giving units 3 to 5.

Figure 9:
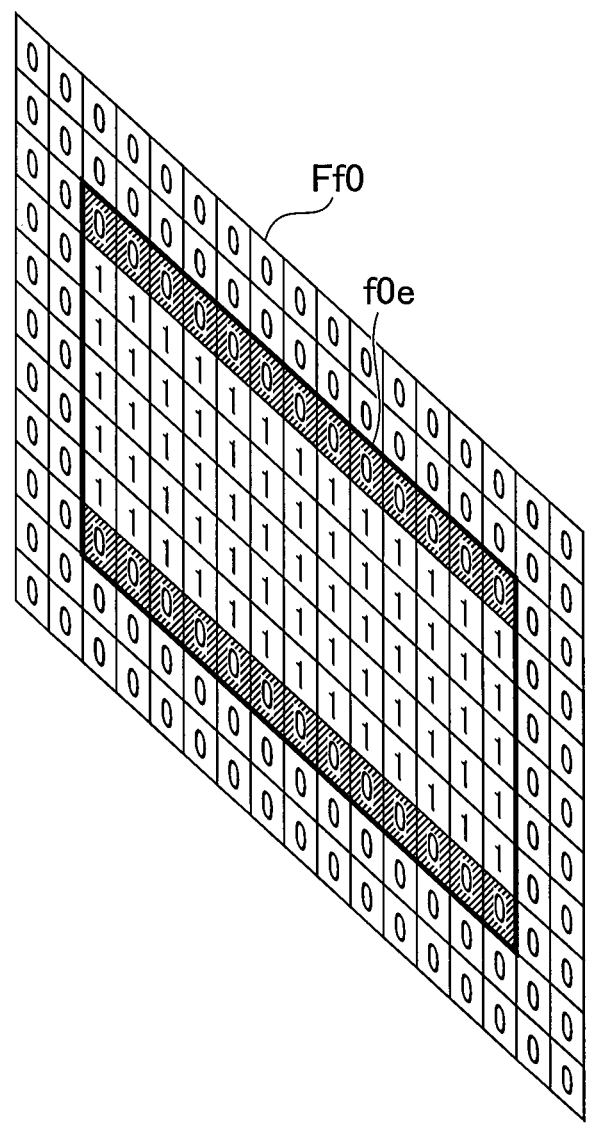
FIG. 9 is a view illustrating area flags given to respective pixels in a frame when a video signal includes black belt areas in the motion vector detection device according to a second embodiment.

FIG. 9 illustrates, as an example, an image of a so-called letter box in which upper and lower end portions of the effective image area f0e inside the frame f0 are black belt areas. Based on the black belt detection signal Sbb, the area flag giving unit 3 gives the flag 0 to each of the pixels of the black belt areas even inside the effective image area f0e. Likewise, the area flag giving units 4 and 5 also give the flag 0 to the pixels in the effective image areas f1e and f2e in the insides of the frame f1 and f2, respectively.

The operations on and after the pixel selector 6 are the same as those of the motion vector detection device according to a first embodiment. In the motion vector detection device according to a second embodiment, the pixel selector 6 only needs to define, as the pixel of interest Pf1, a pixel inside the effective image area f1e other than in the black belt areas.

In accordance with the motion vector detection device according to a second embodiment, even when a part of the search range Rs is located inside the black belt area, a correct motion vector is detected by processing similar to that of the motion vector detection device according to a first embodiment, and the correct motion vector can be detected even when the frame in or the frame out occurs. If the motion vector detection device according to a second embodiment is used, then the interpolation frame generator 8 can generate interpolation images free from a feeling of discomfort on both a center portion and a peripheral portion in the interpolation frame f0.5.

In FIG. 1 and FIG. 8, the frame frequency conversion apparatus that converts the frame frequency of the video signal to the double frequency is described as an example; however, a frame frequency conversion apparatus that converts the frame frequency to a triple frequency may be adopted.

The respective units of FIG. 1 and FIG. 8 may be composed of a hardware circuit, or at least a part thereof may be composed of software (computer program). Choice of the hardware and the software is arbitrary. The computer program may be stored and provided in a non-transitory storage medium.

It should be noted that, besides those already described, varieties of modifications and alterations may be added to the above-described embodiment without deviating from novel and advantageous features of the present invention. Hence, the entire modifications and alterations as described above are intended to be incorporated in the accompanying scope of claims.

What is claimed is:

1. A motion vector detection device which, among three frames arrayed in a time direction in a video signal, defines a frame located at a center as a frame of interest, defines a frame located in a future from the frame of interest as a future frame, and defines a frame located in a past from the frame of interest as a past frame, the motion vector detection device comprising:

an area flag giving unit configured to give a first value as an area flag to respective pixels inside of each of effective image areas of the frame of interest, the future frame, and the past frame, and to give a second value as the area flag to respective pixels on an outside of the effective image area;

a pixel selector configured to select, as a pixel of interest, a pixel inside the effective image area of the frame of interest based on the area flag given to the frame of interest, to set, inside the future frame, a search range corresponding to the pixel of interest, to calculate difference values between the pixel of interest and all pixels inside the search range when determining that all pixels of the future frame, the pixels being included in the search range, are pixels inside the effective image area based on the area flag given to the future frame, to select a pixel with a smallest difference value to extract the pixel as a selected pixel, and to generate correlation information including information indicating a pixel position of the pixel of interest and information indicating a pixel position of the selected pixel; and a motion vector detector configured to detect a motion vector in the pixel of interest based on the correlation information, wherein the pixel selector, when determining that the pixel of the future frame, the pixel being included in the search range, includes a pixel on an outside of the effective image area based on the area flag given to the future frame, and determining that a pixel inside the effective image area of the past frame is present at a position point-symmetric to a pixel inside the search range and on the outside of the effective image area about the pixel of interest based on the area flag given to the past frame, selects a pixel inside the effective image area of the past frame, the pixel being located at the point-symmetric position, in place of the pixel inside the search range and on the outside of the effective image area, and calculates a difference value between the pixel of interest and the selected pixel inside the effective image area of the past frame.

2. The motion vector detection device according to claim 1, wherein, when determining that the pixel of the future frame, the pixel being included in the search range, includes the pixel on the outside of the effective image area based on the area flag given to the future frame, and determining that the pixel inside the effective image area of the past frame is not present at the position point-symmetric to the pixel on the outside of the effective image area inside the search range about the pixel of interest based on the area flag given to the past frame, the pixel selector adjusts a difference value between the pixel of interest and the pixel in the search range and on the outside of the effective image area with reference to correlation information generated in an adjacent pixel to the pixel of interest located inside the frame of interest or the past frame.

3. The motion vector detection device according to claim 1, further comprising:

a black belt detector configured to detect whether or not the video signal has a black belt area and detect a range in which the black belt area is present when the video signal has a black belt area, wherein, when the black belt detector detects that the video signal has a black belt area, the area flag giving unit gives the second value to respective pixels inside the black belt area inside of each of the effective image areas of the frame of interest, the future frame, and the past frame.

* * * * *